United States Patent
Nose et al.

(10) Patent No.: US 10,612,439 B2
(45) Date of Patent: Apr. 7, 2020

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Yuki Nose, Kasugai (JP); Yoshihisa Oda, Toyota (JP); Kazuki Tsuruoka, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 78 days.

(21) Appl. No.: 16/036,081

(22) Filed: Jul. 16, 2018

(65) Prior Publication Data

US 2019/0024556 A1   Jan. 24, 2019

(30) Foreign Application Priority Data

Jul. 24, 2017   (JP) .................... 2017-142763

(51) Int. Cl.
*F01N 3/10* (2006.01)
*F02D 41/24* (2006.01)
(Continued)

(52) U.S. Cl.
CPC .......... *F01N 3/101* (2013.01); *F01N 3/2066* (2013.01); *F01N 9/00* (2013.01); *F01N 11/00* (2013.01); *F01N 11/007* (2013.01); *F02D 35/023* (2013.01); *F02D 41/008* (2013.01); *F02D 41/0085* (2013.01); *F02D 41/024* (2013.01);
(Continued)

(58) Field of Classification Search
CPC .......... F01N 3/101; F01N 3/2066; F01N 9/00; F01N 11/007; F01N 11/00; F01N 2560/025; F01N 2430/06; F02D 35/023; F02D 41/0085; F02D 41/008; F02D 41/1495; F02D 41/025; F02D 41/2458; F02D 41/1408; F02D 41/024; F02D 41/2467; F02D 41/38; F02D 41/1475; F02D 41/1401; F02D 41/0235; F02P 5/1508

See application file for complete search history.

(56) References Cited

U.S. PATENT DOCUMENTS 4,364,227 A * 12/1982 Yoshida .............. F02D 41/1479
                                                      123/695
5,758,493 A *  6/1998 Asik .................. B01D 53/9431
                                                      123/443

(Continued)

FOREIGN PATENT DOCUMENTS

JP         2004-218541          8/2004

*Primary Examiner* — Phutthiwat Wongwian
*Assistant Examiner* — Sherman D Manley
(74) *Attorney, Agent, or Firm* — Finnegan, Henderson, Farabow, Garrett & Dunneer, LLP

(57) ABSTRACT

When a request for temperature increase of a three-way catalyst is made, a CPU executes dither control in which one of a plurality of cylinders is set as a rich combustion cylinder with a richer air-fuel ratio than a stoichiometric air-fuel ratio and the remaining cylinders are set as lean combustion cylinders with a leaner air-fuel ratio than the stoichiometric air-fuel ratio. When not executing the dither control, the CPU learns a rich learning value that is a learning value of a degree of a rich imbalance based on an upstream-side air-fuel ratio. When the rich learning value is greater than or equal to a predetermined value, the CPU prohibits the dither control.

7 Claims, 7 Drawing Sheets

(51) Int. Cl.
    *F01N 11/00*     (2006.01)
    *F02D 41/02*     (2006.01)
    *F02D 41/14*     (2006.01)
    *F02D 41/00*     (2006.01)
    *F02D 35/02*     (2006.01)
    *F01N 9/00*     (2006.01)
    *F01N 3/20*     (2006.01)
    *F02P 5/15*     (2006.01)
    *F02D 43/00*     (2006.01)
    *F02D 45/00*     (2006.01)

(52) U.S. Cl.
    CPC ....... *F02D 41/025* (2013.01); *F02D 41/1408* (2013.01); *F02D 41/1495* (2013.01); *F02D 41/2458* (2013.01); *F02P 5/1508* (2013.01); *F01N 2430/06* (2013.01); *F01N 2560/025* (2013.01); *F02D 41/2467* (2013.01); *F02D 43/00* (2013.01); *F02D 45/00* (2013.01)

(56) References Cited

U.S. PATENT DOCUMENTS

| | | | |
|---|---|---|---|
| 6,142,121 A * | 11/2000 | Nishimura | F02D 41/008 123/447 |
| 6,324,835 B1 * | 12/2001 | Surnilla | B01D 53/9495 123/443 |
| 6,923,169 B2 * | 8/2005 | Demura | F01N 3/32 123/674 |
| 7,813,866 B2 * | 10/2010 | Demura | F02D 41/064 123/491 |
| 8,261,533 B2 * | 9/2012 | Demura | F02D 41/025 60/285 |
| 8,286,418 B2 * | 10/2012 | Demura | F01N 3/0814 60/284 |
| 8,297,041 B2 * | 10/2012 | Demura | B01D 53/9454 60/285 |
| 2004/0250534 A1 * | 12/2004 | Tanaka | F02D 41/0255 60/284 |
| 2005/0092299 A1 * | 5/2005 | Tonetti | F02D 41/0085 123/436 |
| 2008/0276906 A1 * | 11/2008 | Thomas | F02D 41/2438 123/457 |
| 2015/0300245 A1 * | 10/2015 | Korenaga | F02B 37/18 60/603 |
| 2016/0017833 A1 * | 1/2016 | Ulrich | F02D 41/0085 701/104 |
| 2016/0153391 A1 * | 6/2016 | Ranga | F02D 41/402 701/104 |

* cited by examiner

CONTROL APPARATUS FOR INTERNAL COMBUSTION ENGINE

BACKGROUND ART

The present invention relates to a control apparatus for an internal combustion engine including a catalyst that purifies exhaust discharged from a plurality of cylinders, and a plurality of fuel injection valves respectively provided for the plurality of cylinders.

Japanese Laid-Open Patent Publication No. 2004-218541 describes a control apparatus that executes dither control. When a request for temperature increase of a catalytic apparatus is made, the air-fuel ratio in some cylinders is set to be richer than a stoichiometric air-fuel ratio and the air-fuel ratio in the remaining cylinders is set to be leaner than the stoichiometric air-fuel ratio by the dither control so that the air-fuel ratio of exhaust flowing into a catalyst equals a target air-fuel ratio.

In addition, an imbalance learning process is known in which when fuel injection valves are operated to equalize air-fuel ratios in a plurality of cylinders, the variation (imbalance) degree among injection amounts of the fuel injection valves of the plurality of cylinders is learned.

When the imbalance occurs, the air-fuel ratio of an air-fuel mixture that is combusted in each cylinder is deviated from a target value. Thus, the combustion controllability is declined in each cylinder. When dither control is executed, some cylinders are set to have an air-fuel ratio that is richer than a stoichiometric air-fuel ratio and some cylinders are set to have an air-fuel ratio that is leaner than the stoichiometric air-fuel ratio. Thus, the combustion state of each cylinder intentionally needs to be deviated from an optimum state. Therefore, when dither control is executed during an occurrence of an imbalance, the dither control may promote a decline in the combustion controllability attributable to the imbalance.

SUMMARY OF THE INVENTION

Means for Solving the Problem

1. To solve the above problem, a first aspect of the present invention provides a control apparatus for an internal combustion engine. The internal combustion engine includes a catalyst that purifies exhaust discharged from a plurality of cylinders and a fuel injection valve provided for each of the plurality of cylinders. The control apparatus is configured to execute a dither control process that operates the fuel injection valves so as to set at least one of the plurality of cylinders as a lean combustion cylinder, which has an air-fuel ratio that is leaner than a stoichiometric air-fuel ratio, and to set at least a further one of the plurality of cylinders as a rich combustion cylinder, which has an air-fuel ratio that is richer than the stoichiometric air-fuel ratio; an imbalance learning process that learns a variation degree among injection amounts of the fuel injection valves of the plurality of cylinders when the fuel injection valves are operated to equalize air-fuel ratios of the plurality of cylinders; and a limiting process that limits the dither control process to reduce a difference between a richest one and a leanest one of the air-fuel ratios of the plurality of cylinders when the variation degree is greater than or equal to a predetermined value.

With the configuration described above, by limiting dither control when the variation degree is greater than or equal to a predetermined value, a situation in which the dither control promotes a decline in combustion controllability attributable to an imbalance and makes the decline in the controllability more apparent can be avoided or can be limited as compared to when dither control is not limited.

2. Preferably, in the control apparatus for an internal combustion engine described above, the control apparatus is configured to execute a notification process that reports that the variation degree is large by operating a notification device when the variation degree is greater than or equal to a threshold value that is greater than the predetermined value.

In the configuration described above, the predetermined value is set to be less than the threshold value. This reduces or eliminates a constraint when the threshold value is set, that is, consideration that dither control promotes a decline in the combustion controllability attributable to an imbalance and makes the decline in controllability more apparent. Thus, compared to a case where the predetermined value is set to be greater than or equal to the threshold value, the threshold value can be easily set to a large value. Accordingly, execution of notification process is limited.

3. Preferably, in the control apparatus for an internal combustion engine described above, the limiting process includes a process that prohibits the dither control process.

In the configuration described above, the dither control process is prohibited. Thus, a situation in which the dither control promotes a decline in the combustion controllability attributable to an imbalance and makes the decline in controllability more apparent is avoided.

4. Preferably, in the control apparatus for an internal combustion engine described above, the limiting process includes a process that sets a difference between the air-fuel ratio of the lean combustion cylinder and the air-fuel ratio of the rich combustion cylinder to be smaller when the variation degree is greater than or equal to the predetermined value than when the variation degree is less than the predetermined value.

The limiting process described above limits a situation in which the dither control promotes a decline in the combustion controllability attributable to an imbalance and makes the decline in controllability more apparent as compared to a case where the limiting process is not executed.

5. Preferably, in the control apparatus for an internal combustion engine described above, the dither control process includes a variable setting process that variably sets a difference between the air-fuel ratio of the lean combustion cylinder and the air-fuel ratio of the rich combustion cylinder in accordance with an operating point of the internal combustion engine. The limiting process includes a guard process performed on the difference, which is set by the variable setting process, using an upper limit guard value. When the variation degree is greater than or equal to the predetermined value, the upper limit guard value is smaller than when the variation degree is less than the predetermined value.

In the configuration described above, the difference is variably set in accordance with the operating point of the internal combustion engine. Thus, the difference is appropriately set for each operating point taking into consideration that the tendency of the decline in combustion controllability caused by dither control differs depending on the operating point. In addition, the guard process is used as the limiting process. Thus, a maximal consideration is given to the setting of the difference for each operating point performed by the variable setting process.

6. Preferably, in the control apparatus for an internal combustion engine described above, the control apparatus is configured to execute the dither control process on a condition that a request for increasing a temperature of the catalyst is made due to at least a sulfur poisoning recovery request of the catalyst. The control apparatus is configured so that the limiting process limits the dither control process that increases the temperature of the catalyst due to the sulfur poisoning recovery request.

In the sulfur poisoning recovery process, the catalyst is set to a higher temperature than when the process is not executed. Thus, when a decline in the combustion controllability caused by dither control results in an increase in temperature that exceeds a temperature rise performance required by the sulfur poisoning recovery process, deterioration of the catalyst may be facilitated. Hence, execution of the limiting process is particularly effective.

7. Preferably, in the control apparatus for an internal combustion engine described above, the control apparatus is configured to execute the imbalance learning process on a condition that the dither control process is not executed.

In the configuration described above, the imbalance learning process is executed on the condition that the dither control process is not executed. This eliminates the need for consideration of the variation in the air-fuel ratios of the plurality of cylinders caused by dither control. Thus, imbalance learning is easily executed with high accuracy.

Other aspects and advantages of the embodiments will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

First Embodiment

Hereinafter, a first embodiment of a control apparatus for an internal combustion engine will be described with reference to the drawings.

Figure 1:
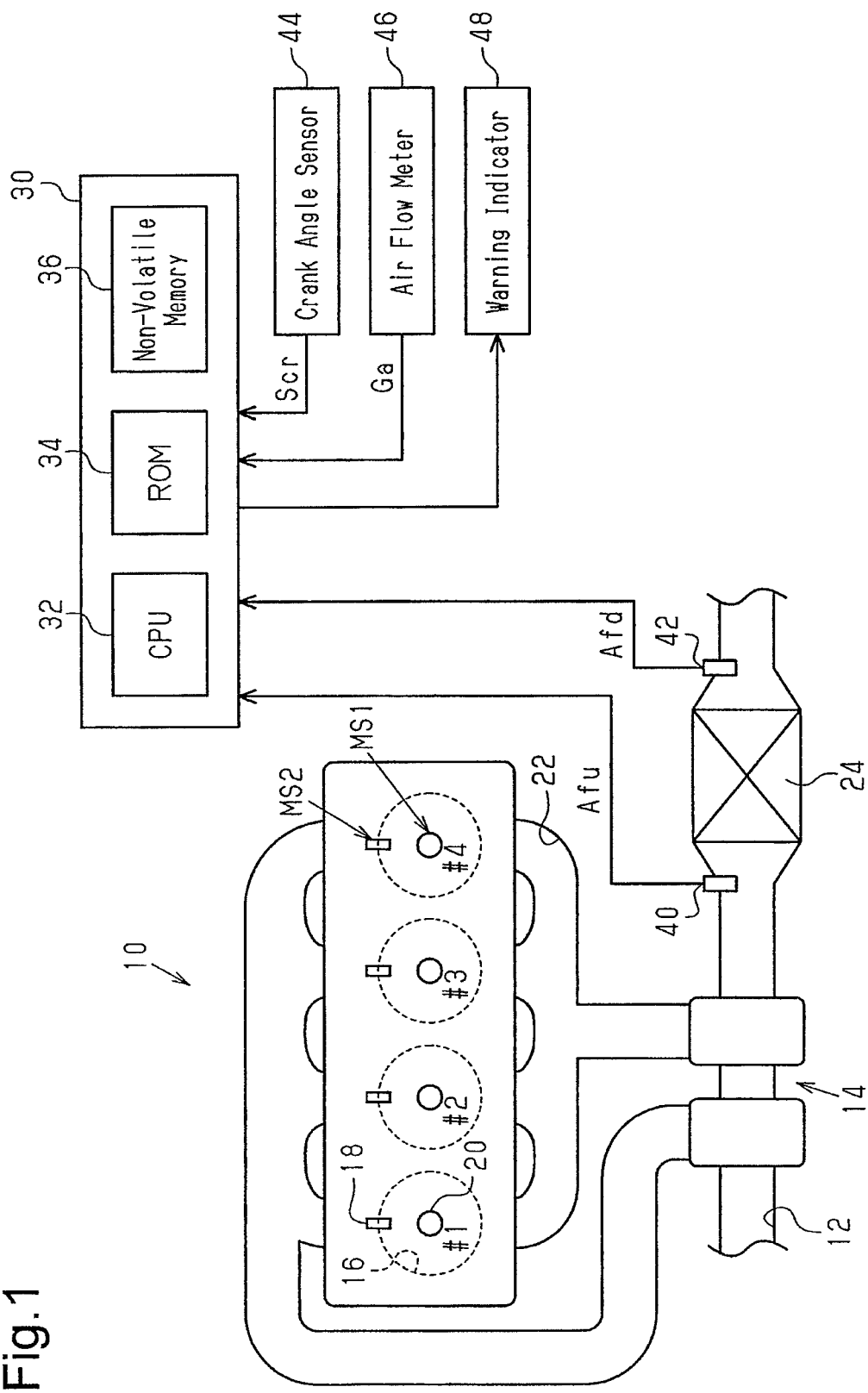
FIG. 1 is a diagram showing a control apparatus and an internal combustion engine according to a first embodiment.

In an internal combustion engine 10 shown in FIG. 1, air sucked in from an intake passage 12 flows into a combustion chamber 16 of each cylinder via a supercharger 14. A fuel injection valve 18 that injects fuel and an ignition device 20 that generates a spark discharge are arranged in the combustion chamber 16. An air-fuel mixture of air and fuel is combusted in the combustion chamber 16. The air-fuel mixture after the combustion is an exhaust and is discharged to an exhaust passage 22. In the exhaust passage 22, a three-way catalyst 24 capable of adsorbing oxygen is provided on a downstream side of the supercharger 14.

A control apparatus 30 controls the internal combustion engine 10. Control amounts (e.g., torque, exhaust components) of the internal combustion engine 10 are controlled by operating units such as the fuel injection valves 18 and the ignition devices 20. The control apparatus 30 refers to an upstream-side air-fuel ratio Afu and a downstream-side air-fuel ratio Afd in order to control the operating units. The upstream-side air-fuel ratio Afu is detected by an upstream-side air-fuel ratio sensor 40 located at an upstream side of the three-way catalyst 24. The downstream-side air-fuel ratio Afd is detected by a downstream-side air-fuel ratio sensor 42 located at a downstream side of the three-way catalyst 24. In addition, the control apparatus 30 refers to an output signal Scr of a crank angle sensor 44 and an intake air amount Ga detected by an air flow meter 46. The control apparatus 30 includes a CPU 32, a ROM 34, and a non-volatile memory 36 that is electrically rewritable. The CPU 32 executes programs stored in the ROM 34. This controls the control amounts of the internal combustion engine 10.

Figure 2:
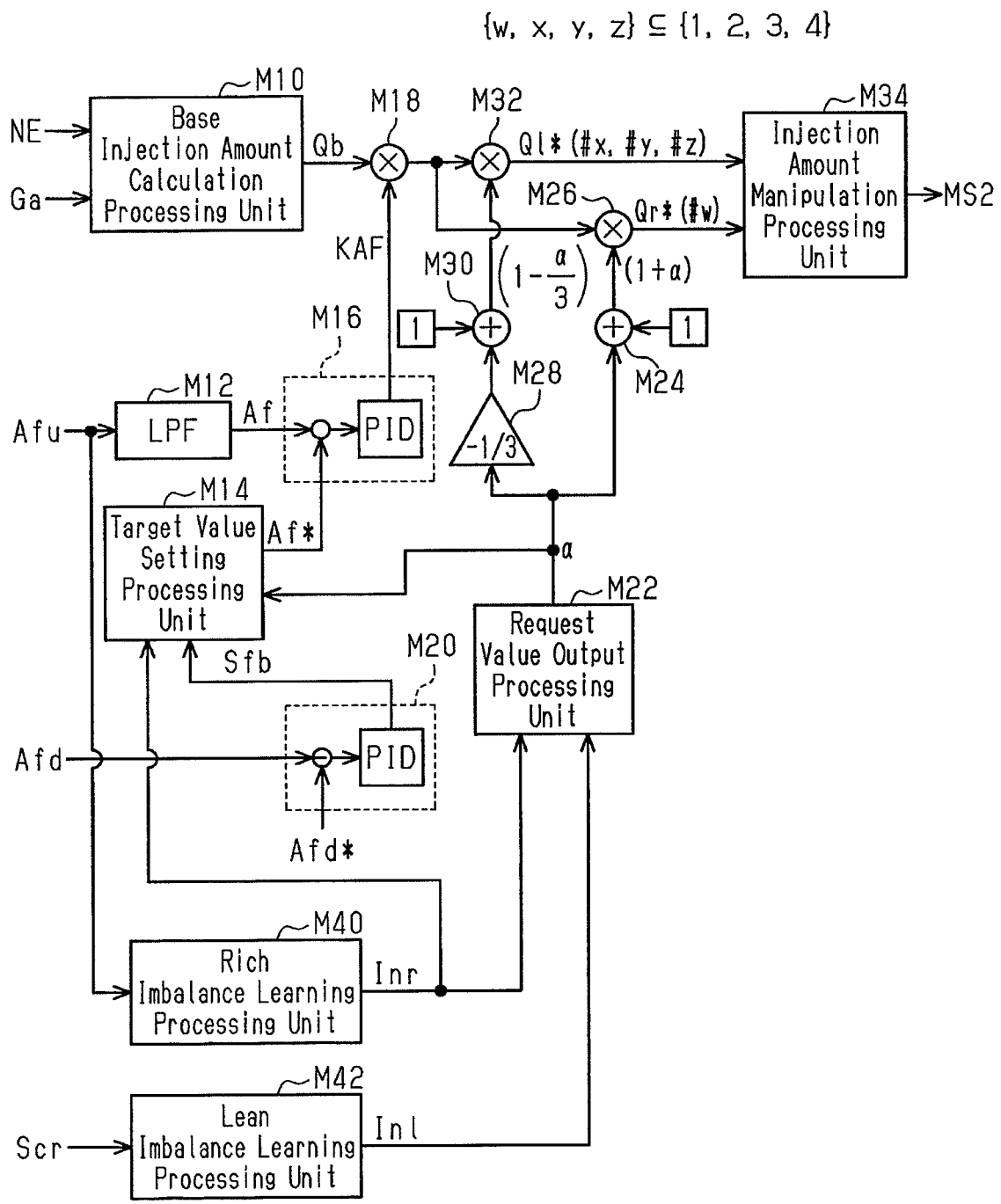
FIG. 2 is a block diagram showing some of the processes executed by a control apparatus.

FIG. 2 shows some of the processes realized when the CPU 32 executes the programs stored in the ROM 34.

A base injection amount calculation processing unit M10 calculates a base injection amount Qb as an open-loop operation amount. The base injection amount Qb is an operation amount for setting the air-fuel ratio of an air-fuel mixture in the combustion chamber 16 to a target air-fuel ratio by open-loop control. The base injection amount Qb is calculated based on a rotational speed NE calculated based on the output signal Scr of the crank angle sensor 44 and on the intake air amount Ga.

A low-pass filter M12 calculates an air-fuel ratio Af as a feedback control amount by removing a high-frequency component from the upstream-side air-fuel ratio Afu. A target value setting processing unit M14 sets a target value Af* of the feedback control amount for setting the air-fuel ratio of the air-fuel mixture in the combustion chamber 16 to the target air-fuel ratio.

A main feedback processing unit M16 calculates a feedback operation amount KAF, which is an operation amount for feedback-controlling the air-fuel ratio Af to the target value Af*. In this case, with the difference between the target value Af* and the air-fuel ratio Af serving as an input, the sum of output values of a proportional element, an integrator element, and a derivative element is adopted as the feedback operation amount KAF.

A feedback correction processing unit M18 corrects the base injection amount Qb by multiplying the base injection amount Qb by the feedback operation amount KAF.

A sub-feedback processing unit M20 outputs a sub-correction amount Sfb to the target value setting processing unit M14. The sub-correction amount Sfb is an operation amount for feedback-controlling the downstream-side air-fuel ratio Afd to a target value Afd*. The target value setting processing unit M14 sets the target value Af* by correcting a value of a control amount corresponding to the target air-fuel ratio with the sub-correction amount Sfb.

A request value output processing unit M22 sets an average value of air-fuel ratios (exhaust air-fuel ratios) of exhausts from cylinders #1 to #4 of the internal combustion engine 10 as the target air-fuel ratio on the condition of a request for temperature increase of the three-way catalyst 24. In addition, the request value output processing unit M22 calculates and outputs an injection amount correction request value α of dither control that causes the cylinders to have different air-fuel ratios of the air-fuel mixture. The dither control sets one of the cylinders among the first cylinder #1 to the fourth cylinder #4 as a rich combustion cylinder having an air-fuel ratio of the air-fuel mixture that is richer than the stoichiometric air-fuel ratio. In addition, the remaining three cylinders are set as lean combustion cylinders each having an air-fuel ratio of the air-fuel mixture that is leaner than the stoichiometric air-fuel ratio. Furthermore, the injection amount in the rich combustion cylinder is set to "1+α" times greater than the output value of the feedback correction processing unit M18. In addition, the injection amount in the lean combustion cylinders is set to "1−(α/3)" times greater than the same output value.

The exhaust air-fuel ratio of target exhaust is determined using a virtual air-fuel mixture. Specifically, the virtual air-fuel mixture is defined as an air-fuel mixture which is constituted by only fresh air and fuel and of which an unburned fuel concentration (e.g., HC), an incompletely combusted component concentration (e.g., CO), and an oxygen concentration of exhaust generated by combustion are the same as the unburned fuel concentration, the incompletely combusted component concentration, and the oxygen concentration of the target exhaust. Therefore, the exhaust air-fuel ratio is defined as an air-fuel ratio of the virtual air-fuel mixture. Combustion of the virtual air-fuel mixture is not limited to combustion in which at least either the unburned fuel concentration and the incompletely combusted component concentration or the oxygen concentration is zero or a value that may be considered zero. The combustion of the virtual air-fuel mixture includes combustion in which the unburned fuel concentration, the incompletely combusted component concentration, and the oxygen concentration are greater than zero. In addition, an average value of the exhaust air-fuel ratios of a plurality of cylinders is an exhaust air-fuel ratio when the entire exhaust discharged from the plurality of cylinders is considered the target exhaust. When the injection amount of each of the lean combustion cylinders and the rich combustion cylinders is set as described above, an average value of exhaust air-fuel ratios may be adopted as the target air-fuel ratio by setting an average value of fuel-air ratios of the air-fuel mixtures combusted in the cylinders to a target fuel-air ratio. A fuel-air ratio is a reciprocal of an air-fuel ratio.

A correction coefficient calculation processing unit M24 adds the injection amount correction request value α to one to calculate a correction coefficient of the output value of the feedback correction processing unit M18 with respect to a rich combustion cylinder. A dither correction processing unit M26 calculates an injection amount command value Qr* of the rich combustion cylinder by multiplying the output value of the feedback correction processing unit M18 by the correction coefficient "1+α."

The multiplication processing unit M28 multiplies the injection amount correction request value α by "−⅓." A correction coefficient calculation processing unit M30 adds an output value of the multiplication processing unit M28 to one to calculate a correction coefficient of the output value of the feedback correction processing unit M18 with respect to a lean combustion cylinder. A dither correction processing unit M32 calculates an injection amount command value Ql* of the lean combustion cylinder by multiplying the output value of the feedback correction processing unit M18 by the correction coefficient "1−(α/3)."

Based on the injection amount command value Qr*, an injection amount manipulation processing unit M34 generates a manipulation signal MS2 of the fuel injection valve 18 of a rich combustion cylinder. The injection amount manipulation processing unit M34 outputs the manipulation signal MS2 to the fuel injection valve 18 and operates the fuel injection valve 18 so that a fuel amount injected from the fuel injection valve 18 equals the amount corresponding to the injection amount command value Qr*. Also, based on the injection amount command value Ql*, the injection amount manipulation processing unit M34 generates a manipulation signal MS2 of the fuel injection valve 18 of a lean combustion cylinder. The injection amount manipulation processing unit M34 outputs the manipulation signal MS2 to the fuel injection valve 18 and operates the fuel injection valve 18 so that a fuel amount injected from the fuel injection valve 18 equals the amount corresponding to the injection amount command value Ql*. It is desirable that the rich combustion cylinder be changed among the cylinders #1 to #4 in a cycle that is longer than one combustion cycle. When the injection amount correction request value α is zero, the dither correction processing units M26 and M32 multiply the output value of the feedback correction processing unit M18 by one. Thus, the injection amount command value of each of the cylinders #1 to #4 conforms to the output value of the feedback correction processing unit M18. For the sake of convenience, FIG. 2 separately shows the injection amount command values Ql* and Qr* during dither control. When the injection amount correction request value α is zero, the manipulation signal MS2 is calculated from the output value of the feedback correction processing unit M18.

A rich imbalance learning processing unit M40 calculates a learning value of a rich imbalance (rich learning value Inr). The rich imbalance refers to a situation in which when the fuel injection valves 18 of the cylinders #1 to #4 are operated to equalize the air-fuel ratios of the air-fuel mixtures in all of the cylinders #1 to #4, the air-fuel ratio of a specific one of the cylinders deviates from the equal value toward a rich side.

Figure 3:
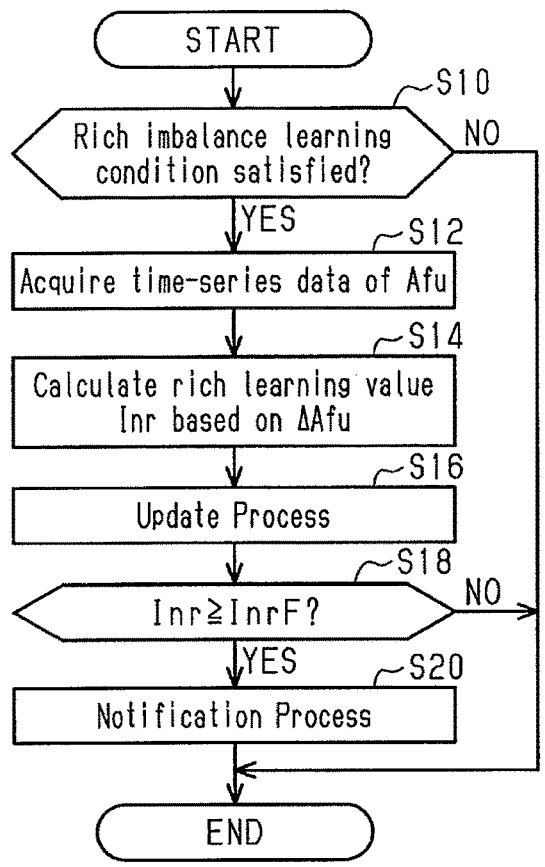
FIG. 3 is a flowchart showing a procedure of processes of a rich imbalance learning processing unit.

FIG. 3 shows the procedure of processes of the rich imbalance learning processing unit M40. The processes shown in FIG. 3 are realized by the CPU 32 repetitively executing a program stored in the ROM 34 in a predetermined cycle. Hereinafter, a step number is expressed by a numeral prefixed with "S."

In the series of processes shown in FIG. 3, the CPU 32 first determines whether or not a rich imbalance learning condition is satisfied (S10). The learning condition is that the logical conjunction of the following conditions (1) to (3) is true.

Condition (1): The rich learning value Inr is not yet calculated and updated during the present trip. A trip refers to a period from when a vehicle including the internal combustion engine 10 is switched from a non-travelable state to a travelable state to when the vehicle is again switched to the non-travelable state. When the internal combustion engine 10 is the sole power engine of the vehicle, switching to the travelable state corresponds to switching the ignition switch to the activation state.

Condition (2): The rotational speed NE is within a predetermined range, and also the intake air amount Ga is within a predetermined range. The learning accuracy is increased when an exhaust flow rate is high as compared to when the exhaust flow rate is low. Thus, the aim of this condition is to execute learning when the exhaust flow rate is higher than or equal to a predetermined value.

Condition (3): Dither control is not executed.

When it is determined that the learning condition is satisfied (S10: YES), the CPU 32 acquires time-series data of the upstream-side air-fuel ratio Afu (S12). The CPU 32 calculates a time variation ΔAfu, which is a variation of the upstream-side air-fuel ratio Afu per predetermined time, from the time-series data of the upstream-side air-fuel ratio Afu. The CPU 32 calculates the rich learning value Inr based on the time variation ΔAfu (S14). The CPU 32 determines that a rich imbalance in a case of a large time variation ΔAfu is larger than a rich imbalance in a case of a small time variation ΔAfu, and calculates a large value of the rich learning value Inr. The CPU 32 updates the rich learning value Inr stored in the non-volatile memory 36 based on the value newly calculated by the process of S14 (S16). At this time, the CPU 32 updates the value stored in the non-volatile memory 36 to an exponential moving average processed value of the value stored in the non-volatile memory 36 in the process of S16 executed in the preceding cycle and the value newly calculated by the process of S14. Next, the CPU 32 determines whether or not the rich learning value Inr is greater than or equal to a threshold value InrF (S18). This is a process that determines whether or not the degree of the rich imbalance exceeds an allowed range. When the rich learning value Inr is greater than or equal to the threshold value InrF (S18: YES), the CPU 32 operates a warning indicator 48 shown in FIG. 1 and executes a notification process that reports an abnormality to prompt the user of the vehicle to resolve the imbalance abnormality at a repair shop (S20).

When a negative determination is made in the processes of S10 and S18 or when the process of S20 is completed, the CPU 32 temporarily ends the series of processes shown in FIG. 3.

Referring again to FIG. 2, a lean imbalance learning processing unit M42 calculates a learning value of a lean imbalance (lean learning value Inl). A lean imbalance refers to a situation in which when the fuel injection valves 18 of the cylinders #1 to #4 are operated to equalize the air-fuel ratios of the air-fuel mixtures in all of the cylinders #1 to #4, the air-fuel ratio of a specific cylinder deviates from the equal value toward a lean side.

Figure 4:
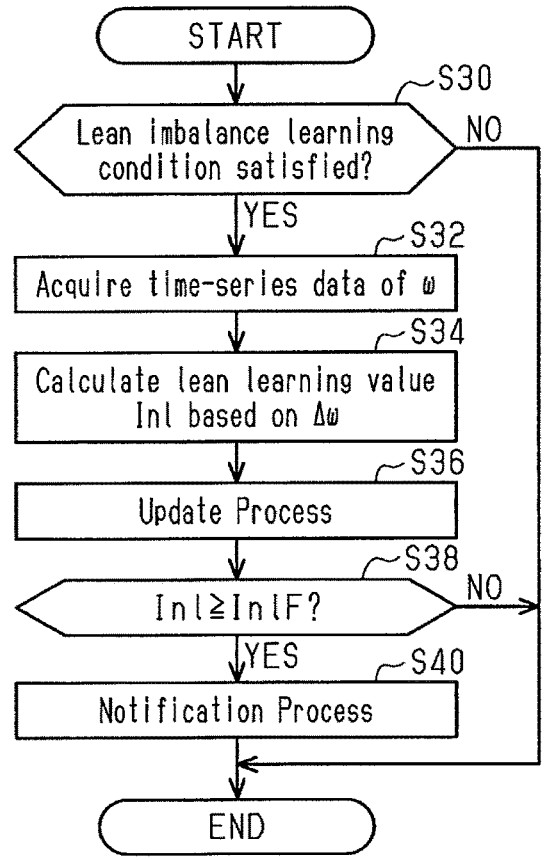
FIG. 4 is a flowchart showing a procedure of processes of a lean imbalance learning processing unit.

FIG. 4 shows the procedure of processes of the lean imbalance learning processing unit M42. The processes shown in FIG. 4 are realized by the CPU 32 repetitively executing a program stored in the ROM 34 in a predetermined cycle.

In the series of processes shown in FIG. 4, the CPU 32 first determines whether or not a learning condition of a lean imbalance is satisfied (S30). The learning condition is that the logical conjunction of a condition provided by substituting the rich learning value Inr with the lean learning value Inl in condition (1) and the conditions (2) and (3) is true. When it is determined that the learning condition is satisfied (S30: YES), the CPU 32 acquires time-series data of an instantaneous speed ω (S32). The instantaneous speed ω is a rotational speed in a 30-degree rotation angle region including the TDC of each of the cylinders #1 to #4 calculated from the output signal Scr of the crank angle sensor 44. The CPU 32 calculates the lean learning value Inl based on a difference Δω between instantaneous speeds ω of a pair of cylinders (S34). The pair of cylinders is, for example, a pair of cylinders for which orders of occurrence of a compression top dead center are adjacent to each other. The CPU 32 determines that the degree of lean imbalance in a case of a large difference Δω is larger than the degree of lean imbalance in a case of a small difference Δω, and calculates a large value of the lean learning value Inl.

The CPU 32 updates the lean learning value Inl stored in the non-volatile memory 36 based on the value newly calculated by the process of S34 (S36). The CPU 32 updates the value stored in the non-volatile memory 36 to an exponential moving average processed value of the value stored in the non-volatile memory 36 in the process of S36 executed in the preceding cycle and the value newly calculated by the process of S34. Based on the difference Δω, the CPU 32 can specify a lean cylinder among the cylinders #1 to #4. Accordingly, the CPU 32 stores the specified cylinder in the non-volatile memory 36. Next, the CPU 32 determines whether or not the lean learning value Inl is greater than or equal to a threshold value InlF (S38). This is a process that determines whether or not the degree of the lean imbalance exceeds an allowed range. When the lean learning value Inl is greater than or equal to the threshold value InlF (S38: YES), the CPU 32 operates the warning indicator 48 shown in FIG. 1 and executes a notification process that reports an abnormality to the user of the vehicle (S40).

When a negative determination is made in the processes of S30 and S38 or when the process of S40 is completed, the CPU 32 temporarily ends the series of processes shown in FIG. 4.

The target value setting processing unit M14 shown in FIG. 2 sets the target value Af* when the rich learning value Inr is large to a richer value than when the rich learning value Inr is small. This measure is taken because when the degree of rich imbalance is large as compared to when the degree of rich imbalance is small, the air-fuel ratio Af deviates toward a rich side from an average value of the exhaust air-fuel ratios of all cylinders #1 to #4. Due to a similar reason, when dither control is executed, the target value setting processing unit M14 sets the target value Af* to a richer value than when dither control is not executed. Based on the lean learning value Inl, only during idling, the CPU 32 increases the injection amount of a cylinder that is lean due to a lean imbalance. This measure is taken because a misfire tends to occur when the actual injection amount is less than the target injection amount during idling.

Figure 5:
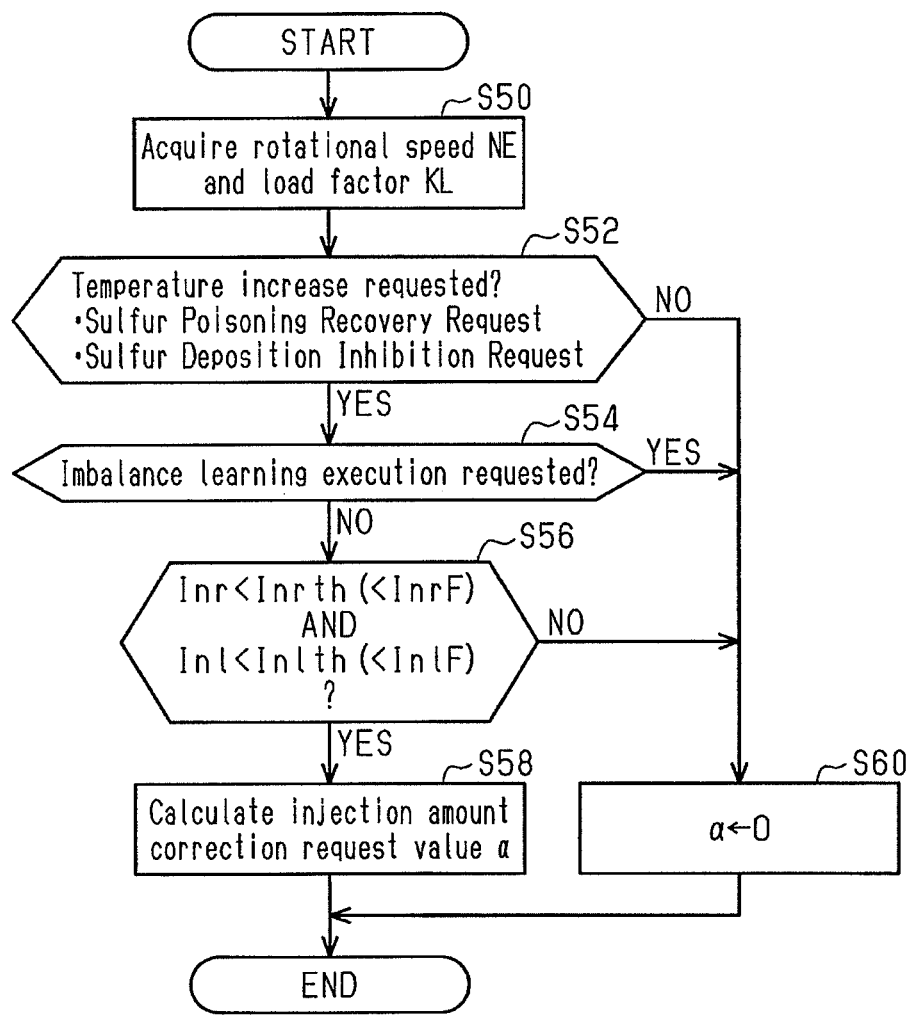
FIG. 5 is a flowchart showing a procedure of processes of a request value output processing unit.

FIG. 5 shows the procedure of processes of the request value output processing unit M22. The processes shown in FIG. 5 are realized by the CPU 32 repetitively executing a program stored in the ROM 34 in a predetermined cycle.

In the series of processes shown in FIG. 5, the CPU 32 first acquires the rotational speed NE and a load factor KL (S50). The load factor KL is a ratio of an inflow air amount per one combustion cycle of a cylinder to a reference inflow air amount and is a value obtained by quantifying a cylinder filling air amount. The reference inflow air amount may be changed in accordance with the rotational speed NE.

Next, the CPU 32 determines whether or not a request for temperature increase of the three-way catalyst 24 is made due to dither control (S52). The request for temperature increase is made when a sulfur poisoning recovery process is requested to be executed. In addition, the request for temperature increase is also made in a driving zone (for example, idling zone) in which sulfur tends to deposit on the three-way catalyst 24. The sulfur poisoning recovery process only needs to be executed when a sulfur poisoning amount of the three-way catalyst 24 is greater than or equal to a value determined in advance. The sulfur poisoning amount may be calculated by calculating a larger amount of increase in the poisoning amount when, for example, the rotational speed NE is high and the load factor KL is high, and adding the amount of increase. However, when dither control is executed, the amount of increase in the poisoning amount is reduced as compared to when dither control is not executed.

When it is determined that a request for temperature increase is made (S52: YES), the CPU 32 determines whether or not a request for imbalance learning is made (S54). The CPU 32 determines that a request for imbalance learning is made when the learning conditions excluding the condition that dither control is not executed in the rich imbalance learning condition are satisfied or the learning conditions excluding the condition that dither control is not executed in the lean imbalance learning condition are satisfied.

When it is determined that the imbalance learning conditions are not satisfied (S54: NO), the CPU 32 determines whether or not the logical conjunction of the rich learning value Inr being less than a specified value Inrth that is less than the threshold value InrF and the lean learning value Inl being less than a specified value Inlth that is less than the threshold value InlF is true (S56). This is a process that determines whether or not dither control is to be allowed. Before the update process described above is performed for the first time, a value larger than the specified value Inrth is stored by default in a storage area of the rich learning value Inr in the non-volatile memory 36. In addition, before the update process described above is performed for the first time, a value larger than the specified value Inlth is stored by default in a storage area of the lean learning value Inl in the non-volatile memory 36. This measure is taken so that the execution of imbalance learning serves as one of the conditions for executing dither control.

When the logical conjunction described above is true (S56: YES), the CPU 32 calculates the injection amount correction request value α in order to execute dither control (S58). In the present embodiment, the CPU 32 variably sets the injection amount correction request value α based on the rotational speed NE and the load factor KL. More specifically, the CPU 32 maximizes the injection amount correction request value α in a medium load zone. This is because combustion is more unstable in a low load zone than in the medium load zone and it is more difficult to increase the injection amount correction request value α in the low load zone than in the medium load zone. Additionally, in a high load zone, the exhaust temperature is high even when dither control is not executed. In addition, the CPU 32 further increases the injection amount correction request value α when the rotational speed NE is high as compared to when the rotational speed NE is low. This is because when the rotational speed NE is high, combustion is more stable than when the rotational speed NE is low, and it is easier to increase the injection amount correction request value α when the rotational speed NE is high. Specifically, map data defining a relationship between the rotational speed NE and the load factor KL as input variables and the injection amount correction request value α as an output variable is stored in the ROM 34 in advance. The CPU 32 may perform a map calculation of the injection amount correction request value α using the map data. The map data is a data set of discrete values of an input variable and an output variable corresponding to each value of the input variable. For example, when a value of the input variable matches any of the values of the input variable in the map data, a value of the corresponding output variable is adopted as a calculation result. When the value of the input variable does not match any of the values of the input variable in the map data, a value obtained by interpolating values of a plurality of output variables included in the data set is adopted as a calculation result.

If it is determined that a request for temperature increase is not made (S52: NO), when it is determined that execution of imbalance learning is requested (S54: YES), or when the rich learning value Inr is greater than or equal to the specified value Inrth or the lean learning value Inl is greater than or equal to the specified value Inlth (S56: NO), the CPU 32 sets the injection amount correction request value α to zero (S60). The setting for proceeding to the process of S60 when a negative determination is made in the process of S56 is a setting for prohibiting dither control when the logical disjunction of the rich learning value Inr being greater than or equal to the specified value Inrth and the lean learning value Inl being greater than or equal to the specified value Inlth is true.

When the processes of S58 and S60 are completed, the CPU 32 temporarily ends the series of processes shown in FIG. 6.

The operation of the present embodiment will now be described.

The CPU 32 calculates the rich learning value Inr and the lean learning value Inl in a state where dither control is not executed. In addition, the CPU 32 executes dither control when a request for temperature increase due to the dither control is made and when the logical conjunction of the rich learning value Inr being less than the specified value Inrth and the lean learning value Inl being less than the specified value Inlth is true. In other words, the CPU 32 prohibits dither control when the rich learning value Inr is greater than or equal to the specified value Inrth or when the lean learning value Inl is greater than or equal to the specified value Inlth. As a result, a decline in the combustion controllability attributable to an imbalance can be prevented from being promoted and becoming apparent due to dither control.

Figure 6A:
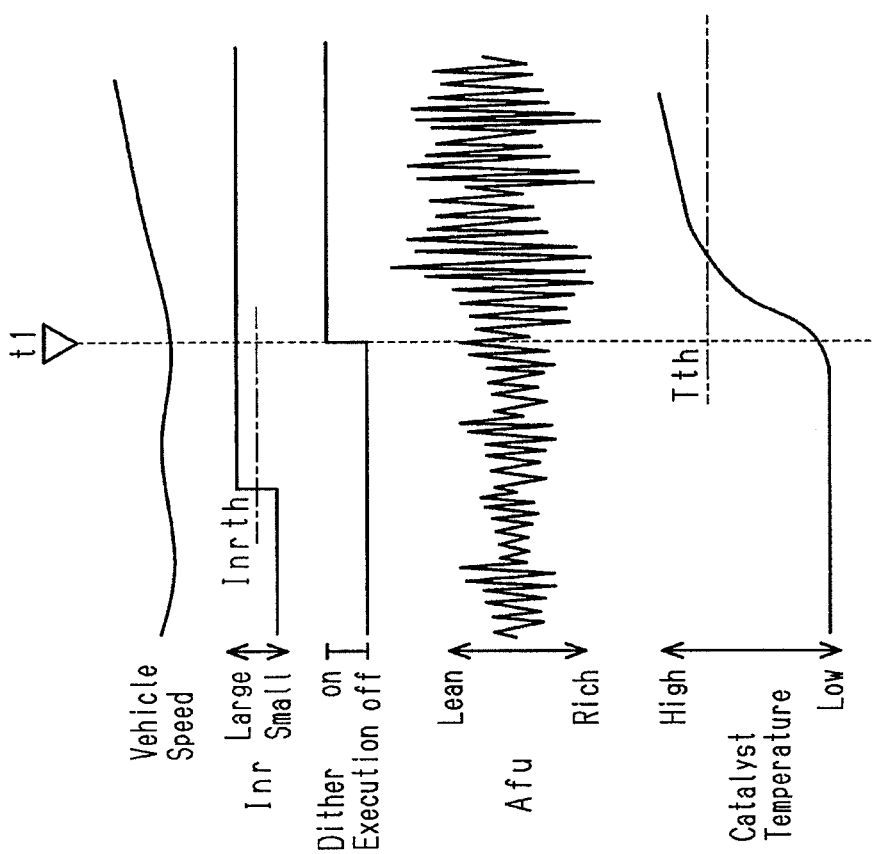
FIGS. 6A and 6B are time charts showing an effect of the first embodiment.
Figure 6B:
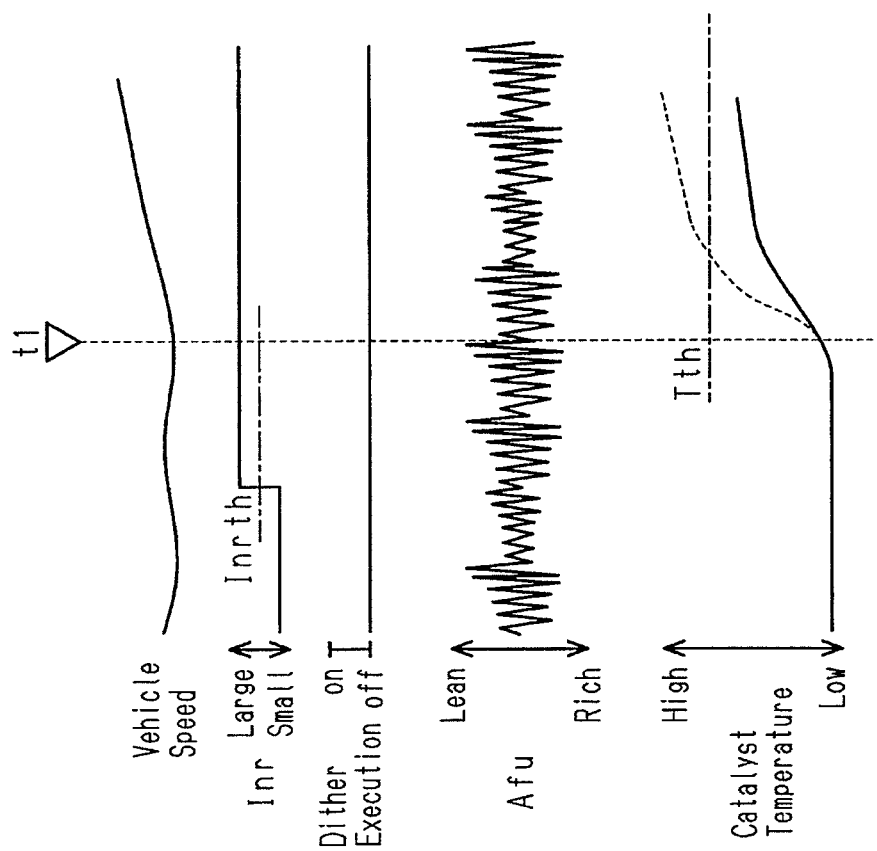

FIG. 6A shows an example of change in the temperature of the three-way catalyst 24 according to the present embodiment. FIG. 6B shows an example of change in the temperature of the three-way catalyst 24 according to a comparative example.

As shown in FIG. 6A, in the present embodiment, request for temperature increase is made at time t1 so that the sulfur poisoning recovery process is executed. However, dither control is not executed because the rich learning value Inr is greater than or equal to the specified value Inrth. Thus, the air-fuel mixture is prevented from excessively deviating from the target air-fuel ratio in each of the cylinders #1 to #4.

In contrast, in the comparative example shown in FIG. 6B, when a request for temperature increase is made at time t1 so that the sulfur poisoning recovery process is executed, dither control is executed regardless of the rich learning value Inr being greater than or equal to the specified value Inrth. Accordingly, the air-fuel ratio of the rich combustion cylinder becomes excessively richer than the degree of enrichment that is expected from the injection amount correction request value α set in the process of S58 shown in FIG. 5. As a result, the temperature of the three-way catalyst 24 rises above a temperature Tth at which deterioration of the three-way catalyst 24 is facilitated.

When dither control is executed in accordance with a request for temperature increase made, for example, during idling, the temperature of the three-way catalyst 24 tends to be lower than or equal to the temperature Tth even when the rich learning value Inr exceeds the specified value Inrth. However, in a case where dither control is executed during an occurrence of an imbalance, the air-fuel mixture excessively deviates from the target air-fuel ratio in each of the cylinders #1 to #4. As a result, a torque variation may become apparent or a misfire may occur.

Prohibition of dither control may cause a decline in a temperature rise performance of the three-way catalyst 24. However, when the rich learning value Inr is greater than or equal to the specified value Inrth or when the lean learning value Inl is greater than or equal to the specified value Inlth, the imbalance abnormality causes oxygen discharged from some cylinders and an unburned fuel component or an incompletely combusted component discharged from other cylinders to flow into the three-way catalyst 24. Accordingly, the temperature of the three-way catalyst 24 rises. This limits the decline in the temperature rise performance attributable to the prohibition of dither control as compared to a case where dither control is prohibited in the absence of an imbalance abnormality.

According to the first embodiment described above, the following advantages are further obtained.

(1) In regard to a rich imbalance, the specified value Inrth is set to be less than the threshold value InrF. This allows the threshold value InrF to be set without consideration that dither control promotes a decline in the combustion controllability attributable to an imbalance and makes the decline in the controllability more apparent. Thus, compared to a case where the specified value Inrth is set to be greater than or equal to the threshold value InrF, the threshold value InrF may be easily set to a large value and, ultimately, execution of a notification process is inhibited. In a similar manner, in regard to a lean imbalance, the specified value Inlth is set to be less than the threshold value InlF. This allows the threshold value InlF to be set without consideration that dither control promotes a decline in the combustion controllability attributable to an imbalance and makes the decline in controllability more apparent. Thus, compared to a case where the specified value Inlth is set to be greater than or equal to the threshold value InlF, the threshold value InlF may be easily set to a large value and, ultimately, execution of a notification process is inhibited.

(2) An imbalance learning process is executed on the condition that a dither control process is not executed. This eliminates the need for consideration of a variation in air-fuel ratios of the cylinders #1 to #4 due to dither control. Thus, imbalance learning is executed with high accuracy.

Second Embodiment

Hereinafter, a second embodiment will be described with reference to the drawings with a focus on differences from the first embodiment.

In the second embodiment, even when the rich learning value Inr is less than the specified value Inrth and the lean learning value Inl is less than the specified value Inlth, the injection amount correction request value α is limited based on the rich learning value Inr and the lean learning value Inl. In this case, the specified values Inrth and Inlth need not be the same as those described in the first embodiment.

Figure 7:
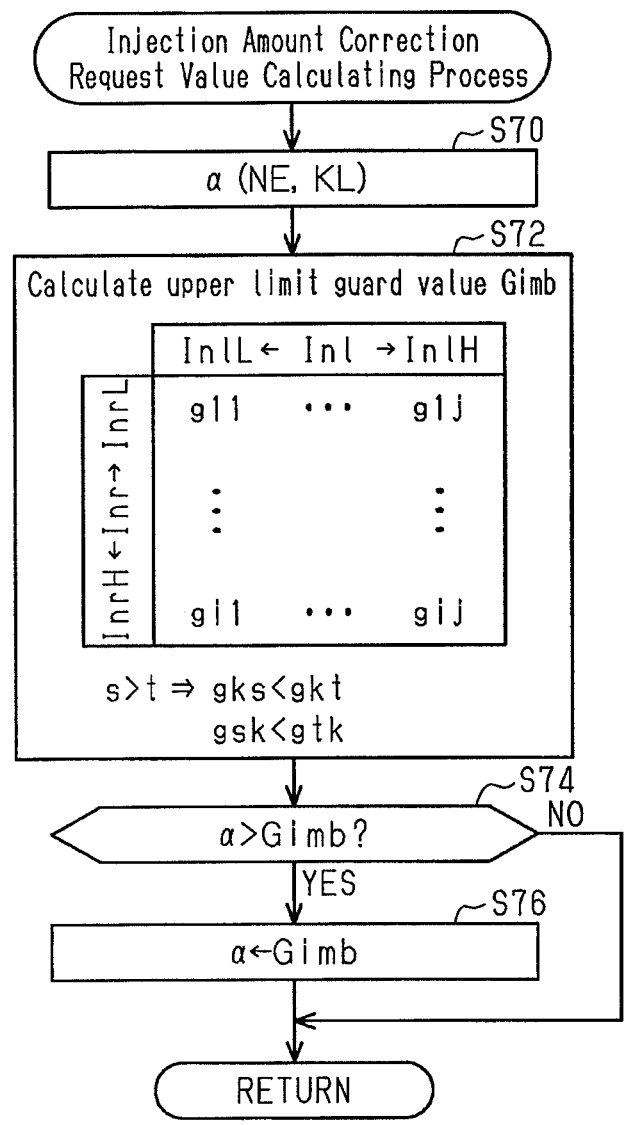
FIG. 7 is a flowchart showing a procedure of an injection amount correction request value calculating process according to a second embodiment.

FIG. 7 shows the procedure of an injection amount correction request value calculating process according to the second embodiment. The processes shown in FIG. 7 are an alternative to the process of S58 in FIG. 5. The processes shown in FIG. 7 are realized by the CPU 32 repetitively executing a program stored in the ROM 34 in a predetermined cycle.

In the series of processes shown in FIG. 7, first, the CPU 32 variably sets the injection amount correction request value α based on the rotational speed NE and the load factor KL (S70). This process is the same as the process described in the first embodiment. Next, the CPU 32 calculates an upper limit guard value Gimb of the injection amount correction request value α based on the rich learning value Inr and the lean learning value Inl (S72). The CPU 32 calculates the upper limit guard value Gimb when the rich learning value Inr is large to be less than the upper limit guard value Gimb when the rich learning value Inr is small. In addition, the CPU 32 calculates the upper limit guard value Gimb when the lean learning value Inl is large to be less than the upper limit guard value Gimb when the lean learning value Inl is small. More specifically, map data having the rich learning value Inr and the lean learning value Inl as input variables and the upper limit guard value Gimb as an output variable is stored in the ROM 34 in advance. The CPU 32 calculates the upper limit guard value Gimb by a map calculation. FIG. 7 shows a maximum value InrH and a minimum value InrL of the rich learning value Inr and a maximum value InlH and a minimum value InlL of the lean learning value Inl as input variables of map data. FIG. 7 also shows, with respect to output variables gnm (m=1, 2, 3, . . . ; n=1, 2, 3, . . . ), that an output variable gks when the rich learning value Inr is large is less than an output variable gkt when the rich learning value Inr is small and an output variable gsk when the lean learning value Inl is large is less than an output variable gtk when the lean learning value Inl is small. The upper limit guard value Gimb is a value matching any of the output variables gnm obtained by the map calculation or a value calculated by an interpolation calculation performed on a plurality of output variables.

The CPU 32 determines whether or not the injection amount correction request value α is greater than the upper limit guard value Gimb (S74). Subsequently, when the injection amount correction request value α is greater than the upper limit guard value Gimb (S74: YES), the CPU 32 assigns the upper limit guard value Gimb to the injection amount correction request value α (S76). When the process of S76 is completed or when a negative determination is made in S74, the CPU 32 temporarily ends the series of processes shown in FIG. 7.

The operation of the present embodiment will now be described.

When the CPU 32 calculates the injection amount correction request value α based on the rotational speed NE and the load factor KL, the CPU 32 performs a guard process using the upper limit guard value Gimb. The CPU 32 calculates the upper limit guard value Gimb when the rich learning value Inr is greater than or equal to a predetermined value between the maximum value InrH and the minimum value InrL of the map data to be less than the upper limit guard value Gimb when the rich learning value Inr is less than the predetermined value. In addition, the CPU 32 calculates the upper limit guard value Gimb when the lean learning value Inl is greater than or equal to a predetermined value between the maximum value InlH and the minimum value InlL of the map data to be less than the upper limit guard value Gimb when the lean learning value Inl is less than the predetermined value. Therefore, the injection amount correction request value α when the degree of imbalance is large is less than the injection amount correction request value α when the degree of imbalance is small.

Accordingly, the specified values Inrth and Inlth may be more easily set to large values as compared to the first embodiment. As a result, dither control may maximally be executed while limiting the injection amount correction request value α.

Third Embodiment

Hereinafter, a third embodiment will be described with reference to the drawings with a focus on differences from the second embodiment.

Figure 8:
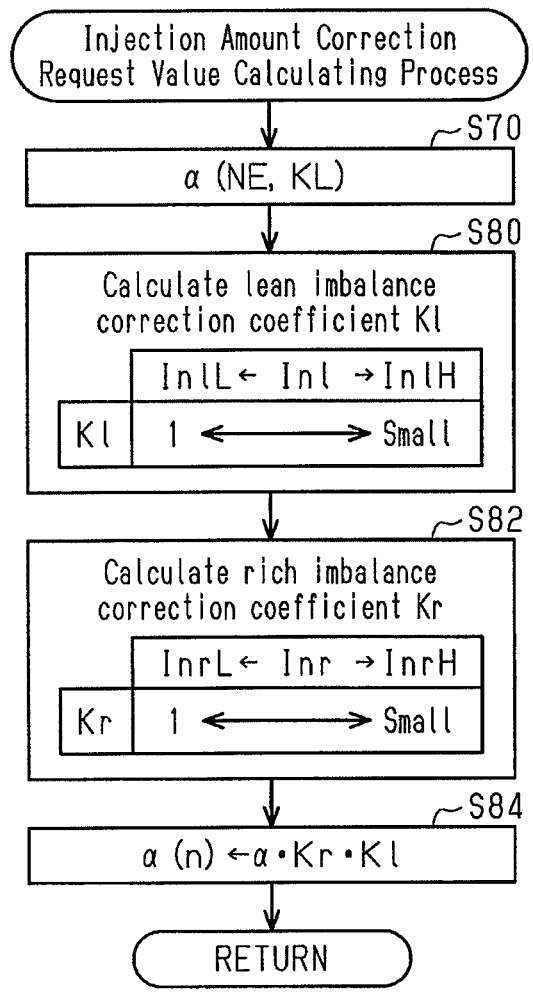
FIG. 8 is a flowchart showing a procedure of an injection amount correction request value calculating process according to a third embodiment.

FIG. 8 shows the procedure of an injection amount correction request value calculating process according to the third embodiment. The processes shown in FIG. 8 are realized by the CPU 32 repetitively executing a program stored in the ROM 34 in a predetermined cycle. In FIG. 8, for the sake of convenience, the same step numbers are assigned to processes corresponding to the processes shown in FIG. 7.

In the series of processes shown in FIG. 8, the CPU 32 variably sets the injection amount correction request value $\alpha$ based on the rotational speed NE and the load factor KL (S70). In addition, the CPU 32 calculates a lean imbalance correction coefficient Kl of the injection amount correction request value $\alpha$ based on the lean learning value Inl (S80). Specifically, the CPU 32 calculates the lean imbalance correction coefficient Kl when the lean learning value Inl is large to be less (>0) than the lean imbalance correction coefficient Kl when the lean learning value Inl is small. More specifically, map data having the lean learning value Inl as an input variable and the lean imbalance correction coefficient Kl as an output variable is stored in the ROM 34 in advance. In addition, the CPU 32 performs a map calculation of the lean imbalance correction coefficient Kl. FIG. 8 shows the maximum value InlH and the minimum value InlL of the lean learning value Inl as the input variables of the map data and also shows that the lean imbalance correction coefficient Kl is "1" at the minimum value InlL.

Next, the CPU 32 calculates a rich imbalance correction coefficient Kr of the injection amount correction request value $\alpha$ based on the rich learning value Inr (S82). Specifically, the CPU 32 calculates the rich imbalance correction coefficient Kr when the rich learning value Inr is large to be less (>0) than the rich imbalance correction coefficient Kr when the rich learning value Inr is small. More specifically, map data having the rich learning value Inr as an input variable and the rich imbalance correction coefficient Kr as an output variable is stored in the ROM 34 in advance. The CPU 32 performs a map calculation of the rich imbalance correction coefficient Kr. FIG. 8 shows the maximum value InrH and the minimum value InrL of the rich learning value Inr as the input variables of the map data and also shows that the rich imbalance correction coefficient Kr is "1" at the minimum value InrL.

In addition, the CPU 32 multiplies the injection amount correction request value $\alpha$ calculated in the process of S80 by the rich imbalance correction coefficient Kr and the lean imbalance correction coefficient Kl. The CPU 32 sets the obtained value as a final injection amount correction request value $\alpha$ (S84).

When the process of S84 is completed, the CPU 32 temporarily ends the series of processes shown in FIG. 8.

Even with the third embodiment, the advantages of the second embodiment are obtained.

The correspondence between the matters according to the embodiments described above and the matters described in the section titled "SUMMARY OF THE INVENTION" is as follows. Hereinafter, the correspondence is shown for each of the numbers assigned to the solutions described in the section titled "Means for Solving the Problem."

[1] The catalyst corresponds to the three-way catalyst 24. The dither control process corresponds to the correction coefficient calculation processing unit M24, the dither correction processing unit M26, the multiplication processing unit M28, the correction coefficient calculation processing unit M30, the dither correction processing unit M32, the injection amount manipulation processing unit M34, and the processes of S52 and S58 (S70). The imbalance learning process corresponds to the processes of S10 to S16 and S30 to S36. In the first embodiment, the predetermined value corresponds to the specified values Inrth and Inlth. In the second and third embodiments, the predetermined value corresponds to the specified values Inrth and Inlth or a value between the minimum value InrL (InlL) and the maximum value InrH (InlH). In the first embodiment, the limiting process corresponds to the process for proceeding to the process of S60 when a negative determination is made in S56. In the second embodiment, the limiting process corresponds to the processes of S72 to S76. In the third embodiment, the limiting process corresponds to the processes of S80 to S84.

[2] The notification device corresponds to the warning indicator 48.

The invention related to [3] corresponds to the process for proceeding to the process of S60 when a negative determination is made in S56.

The invention related to [4] corresponds to the processes of S72 to S76 or the processes of S80 to S84.

[5] The variable setting process corresponds to the process of S70. The guard process corresponds to the processes of S74 and S76. In other words, the difference in the air-fuel ratio between a lean combustion cylinder and a rich combustion cylinder is an amount determined in accordance with the injection amount correction request value $\alpha$. Thus, the guard process performed on the injection amount correction request value $\alpha$ can be considered a guard process performed on the difference.

The invention related to [7] corresponds to the processes of S10 and S30.

At least one of the matters of the embodiments described above may be modified as follows.

If dither control is executed on the condition that a request for warming up the three-way catalyst 24 is made, the dither control for warming up the three-way catalyst 24 may be prohibited when the rich learning value Inr is greater than or equal to the specified value Inrth or when the lean learning value Inl is greater than or equal to the specified value Inlth.

In the embodiments described above, dither control is consistently prohibited when the rich learning value Inr is greater than or equal to the specified value Inrth or when the lean learning value Inl is greater than or equal to the specified value Inlth. However, this configuration is not restrictive. For example, dither control may be prohibited only when a request for temperature increase is made due to a sulfur poisoning recovery request. When the rich learning value Inr is greater than or equal to the specified value Inrth or when the lean learning value Inl is greater than or equal to the specified value Inlth, it is not necessary to prohibit dither control due to the sulfur poisoning recovery request. For example, if a temperature sensor for detecting the temperature of the three-way catalyst 24 is provided and the temperature of the three-way catalyst 24 is controllable so as not to exceed the temperature Tth by stopping dither control based on a detected value of the temperature sensor, the injection amount correction request value $\alpha$ may be only limited to a small value until the dither control is stopped.

In the second and third embodiments, dither control is prohibited when the rich learning value Inr is greater than or equal to the specified value Inrth or when the lean learning value Inl is greater than or equal to the specified value Inlth.

However, this configuration is not restrictive. For example, even when the rich learning value Inr is greater than or equal to the specified value Inrth or when the lean learning value Inl is greater than or equal to the specified value Inlth, dither control may be executed while limiting the injection amount correction request value α to a smaller value than an injection amount correction request value α that is determined from the rotational speed NE and the load factor KL. In this case, dither control may be prohibited when the rich learning value Inr becomes or exceeds the threshold value InrF or when the lean learning value Inl becomes or exceeds the threshold value InlF. Furthermore, cases where dither control is not prohibited when the rich learning value Inr is greater than or equal to the specified value Inrth or when the lean learning value Inl is greater than or equal to the specified value Inlth are not limited to the modified example described above. Specifically, such cases are not limited to a case where the injection amount correction request value α is limited to smaller values as the rich learning value Inr increases in a range in which the rich learning value Inr is less than the specified value Inrth and a case where the injection amount correction request value α is limited to smaller values as the lean learning value Inl increases in a range in which the lean learning value Inl is less than the specified value Inlth. For example, in the second embodiment, two values may be prepared as the upper limit guard value Gimb. The smaller value may be used when the rich learning value Inr is greater than or equal to the specified value Inrth than when the rich learning value Inr is less than the specified value Inrth. The smaller value may be used when the lean learning value Inl is greater than or equal to the specified value Inlth than when the lean learning value Inl is less than the specified value Inlth.

If a process that increases the fuel injection amount of a cylinder having a lean imbalance is executed at a time other than during idling and the increase amount correction is performed with high accuracy, dither control does not have to be limited during occurrence of the lean imbalance. Dither control may be limited on the condition that a rich imbalance occurs.

When an injection amount correction is performed on each cylinder attributable to an imbalance, the limitation of dither control is not necessary. For example, even during execution of the injection amount correction, if dither control may promote a decline in the combustion controllability due to errors in the injection amount correction and make the decline in the controllability more apparent, it is desirable that dither control be limited.

In the embodiments described above, a value stored in the non-volatile memory 36 is used as a learning value for determining whether or not dither control is to be limited. However, this configuration is not restrictive. For example, a value stored in a RAM may be used. In this case, when a value is not stored in the RAM, or, in other words, when a learning value is not yet calculated during the current trip, dither control may be prohibited on the basis of an absence of a learning value for determining whether or not dither control is to be limited. Alternatively, when a learning value is not yet calculated during the current trip, dither control may be prohibited based on a condition other than the learning value stored in a RAM. For example, dither control may be prohibited when an update process of the learning value stored in the non-volatile memory 36 is not yet performed during the current trip.

A learning process that learns the rich learning value Inr is not limited to that exemplified in the embodiments described above. For example, the rich learning value Inr may be calculated based on a difference between a local maximum value and a local minimum value of the upstream-side air-fuel ratio Afu. Specifically, the rich learning value Inr may be calculated based on a determination that when a difference between the local maximum value and the local minimum value of the upstream-side air-fuel ratio Afu is large, the degree of rich imbalance is greater than when the difference is small. A learning process that learns the rich learning value Inr does not necessarily have to use the upstream-side air-fuel ratio Afu. For example, the rich learning value Inr may be calculated based on a determination that when a deviation amount of the downstream-side air-fuel ratio Afd from the target air-fuel ratio toward a lean side is large, the degree of rich imbalance is greater than when the deviation amount toward the lean side is small.

A learning process that learns the lean learning value Inl is not limited to that exemplified in the embodiments described above. For example, the rotation angle region used to calculate the instantaneous speed ω does not have to include TDC. In addition, the instantaneous speed ω is not limited to a speed in a rotation angle region of 30-degree C.A and may be, for example, a speed in a rotation angle region of 60-degree C.A. However, it is desirable that a period during which the rotational speed of a crank shaft attains local maximum due to a combustion stroke of each cylinder be included. In addition, the lean learning value Inl may be calculated based on a determination that when a deviation amount of the downstream-side air-fuel ratio Afd from the target air-fuel ratio toward a lean side is large, the degree of lean imbalance is greater than when the deviation amount toward the lean side is small.

It is not necessary to separately learn the rich learning value Inr and the lean learning value Inl. For example, the degree of imbalance may be learned based on a determination that when a deviation amount of the downstream-side air-fuel ratio Afd from the target air-fuel ratio toward a lean side is large, the degree of lean or rich imbalance is greater than when the deviation amount toward the lean side is small.

The learning process of imbalance is not limited to a learning process using a value of an air-fuel ratio sensor or the instantaneous speed ω. For example, a cylinder internal pressure sensor may be provided for each of the cylinders #1 to #4, and a heat generation rate may be calculated based on the detected value of the sensor. An injection amount may be estimated based on the heat generation rate, and the variation degree of the estimated injection amount may be quantified. In this case, when the accuracy for estimating the injection amount is sufficiently increased, the degree of imbalance may be calculated from an estimated injection amount from which an amount corresponding to variation caused by dither control is excluded. In other words, imbalance learning may be executed during execution of dither control.

When the rich learning value Inr is greater than or equal to the threshold value InrF or the lean learning value Inl is greater than or equal to the threshold value InlF, a notification process that notifies the user of the situation is executed. However, this configuration is not restrictive. For example, an upper limit value of output of the internal combustion engine 10 may be limited to a smaller value than a case where the rich learning value Inr is less than the threshold value InrF and the lean learning value Inl is also less than the threshold value InlF. This process may be executed in combination with the notification process.

The temperature increase target is not limited to the three-way catalyst 24. For example, the temperature increase target may be a gasoline particulate filter (GPF) provided with a three-way catalyst. When the GPF is provided at the downstream side of the three-way catalyst 24, the temperature of the GPF may be increased using oxidation heat generated in the three-way catalyst 24 when an unburned fuel component or an incompletely combusted component of a rich combustion cylinder is oxidized by oxygen of a lean combustion cylinder. When a catalyst capable of adsorbing oxygen is not provided at the upstream side of the GPF, it is desired that the GPF include a catalyst capable of adsorbing oxygen.

The request for temperature increase is not limited to that exemplified in the embodiments described above. For example, a request for temperature increase by dither control may be made for warming up the three-way catalyst 24 during a cold start of the internal combustion engine 10. For example, the request for temperature increase may be determined when the logical conjunction of conditions (A) and (B) is true. The condition (A) is that the temperature of a distal portion of the catalyst is estimated to be an active temperature based on an accumulated air amount from the start of the internal combustion engine 10 being greater than or equal to a specified value. The condition (B) is that a warm-up request is made due to a water temperature being lower than or equal to a predetermined temperature and the accumulated air amount being less than or equal to a predetermined value (>specified value). The condition (A) is a condition ensuring that, in regard to the distal portion of the three-way catalyst 24, the oxygen adsorbability is activated and heat of reaction between oxygen discharged from a lean combustion cylinder and an unburned fuel component or an incompletely combusted component discharged from a rich combustion cylinder is usable.

In addition, as described above, when the internal combustion engine 10 provided with a GPF is considered a control target, a request for temperature increase by dither control may be made in order to combust particulate matter inside the GPF.

The notification device is not limited to a warning indicator and may be a display device that provides the user with visual information indicating the presence of an abnormality.

The injection amount correction request value α may be variably set based on a temperature of cooling water (a water temperature THW) of the internal combustion engine 10 in addition to the rotational speed NE and the load factor KL. In addition, the injection amount correction request value α may be variably set based on only two parameters of the rotational speed NE and the water temperature THW or the load factor KL and the water temperature THW. Furthermore, the injection amount correction request value α may be variably set based on only one parameter among the three parameters. Moreover, instead of using the rotational speed NE and the load factor KL as parameters for specifying an operating point of the internal combustion engine 10, an accelerator operation amount as a load may be used in place of the load factor KL as a load. In addition, the injection amount correction request value α may be variably set based on the intake air amount Ga in place of the rotational speed NE and the load.

It is not necessary to variably set the injection amount correction request value α based on the parameters described above. For example, the injection amount correction request value α may be a fixed value.

In the embodiments described above, the number of lean combustion cylinders is set to be greater than the number of rich combustion cylinders. However, this configuration is not restrictive. For example, the number of rich combustion cylinders and the number of lean combustion cylinders may be the same. In addition, all of the cylinders #1 to #4 need not be set as either a lean combustion cylinder or a rich combustion cylinder. For example, the air-fuel ratio of a cylinder may be set to the target air-fuel ratio. Furthermore, it is not necessary to set an average value of exhaust air-fuel ratios in one combustion cycle to the target air-fuel ratio. For example, in the case of four cylinders as in the embodiments described above, the cylinders may be controlled so that the average value of the exhaust air-fuel ratios in five strokes is set to a target value or the average value of the exhaust air-fuel ratios in three strokes is set to the target value. However, it is desirable that a period during which both a rich combustion cylinder and a lean combustion cylinder exist in one combustion cycle occur once or more in at least every two combustion cycles. In other words, when the average value of exhaust air-fuel ratios is set to the target air-fuel ratio in a predetermined period, it is desirable that the predetermined period be set to two combustion cycles or less. When the predetermined period is two combustion cycles and a rich combustion cylinder exists only once during the two combustion cycles, an order in which the rich combustion cylinder and the lean combustion cylinder appear is as follows. In other words, when the rich combustion cylinder is denoted by R and the lean combustion cylinder by L, the order is expressed as "R, L, L, L, L, L, L, L." In this case, in one combustion cycle, which is shorter than the predetermined period, in which the order is expressed as "R, L, L, L," some of the cylinders #1 to #4 are lean combustion cylinders and the remaining cylinder is a rich combustion cylinder. When the average value of exhaust air-fuel ratios in one combustion cycle is not set to the target air-fuel ratio, it is desirable that an amount of air that is temporarily sucked by the internal combustion engine in the intake stroke and blown back into an intake passage before the intake valve is closed be negligible.

The control apparatus is not limited to a control apparatus that includes the CPU 32 and the ROM 34 and executes software processing. For example, in the embodiments described above, a dedicated hardware circuit (for example, an ASIC) that performs hardware processing may be provided for at least some of a software-processed control apparatus. In other words, the control apparatus only needs to be configured as described in any one of the following configurations (a) to (c). Configuration (a) includes a processing device that executes all of the processes described above in accordance with a program and a program storage device such as a ROM storing the program. Configuration (b) includes a processing device that executes some of the processes described above in accordance with a program, a program storage device, and a dedicated hardware circuit that executes the remaining processes. Configuration (c) includes a dedicated hardware circuit that executes all of the processes described above. A software processing circuit that includes a processing device and a program storage device or a dedicated hardware circuit may be provided in plurality. In other words, the processes described above only need to be executed by a processing circuit including at least one of one or multiple software processing circuits and one or multiple dedicated hardware circuits.

The internal combustion engine is not limited to a four-cylinder internal combustion engine and may be a straight-six internal combustion engine. The internal combustion engine may also be an internal combustion engine including a first catalyst and a second catalyst such as a V-internal combustion engine. The first catalyst and the second catalyst purify exhaust of different cylinders.

The fuel injection valve is not limited to a fuel injection valve that injects fuel into the combustion chamber 16 and may be a fuel injection valve that injects fuel into the intake passage 12. It is not necessary to perform air-fuel ratio feedback control during execution of dither control.

The present examples and embodiments are to be considered as illustrative and not restrictive, and the invention is not to be limited to the details given herein, but may be modified within the scope and equivalence of the appended claims.

The invention claimed is:

1. A control apparatus for an internal combustion engine, the internal combustion engine including:
    a catalyst that purifies exhaust discharged from a plurality of cylinders; and
    a fuel injection valve provided for each of the plurality of cylinders, wherein
    the control apparatus is configured to execute:
    a dither control process that operates the fuel injection valves so as to set at least one of the plurality of cylinders as a lean combustion cylinder, which has an air-fuel ratio that is leaner than a stoichiometric air-fuel ratio, and to set at least a further one of the plurality of cylinders as a rich combustion cylinder, which has an air-fuel ratio that is richer than the stoichiometric air-fuel ratio;
    an imbalance learning process that learns a variation degree among injection amounts of the fuel injection valves of the plurality of cylinders when the fuel injection valves are operated to equalize air-fuel ratios of the plurality of cylinders; and
    a limiting process that limits the dither control process to reduce a difference between a richest one and a leanest one of the air-fuel ratios of the plurality of cylinders when the variation degree is greater than or equal to a predetermined value.

2. The control apparatus for an internal combustion engine according to claim 1, wherein the control apparatus is configured to execute a notification process that reports that the variation degree is large by operating a notification device when the variation degree is greater than or equal to a threshold value that is greater than the predetermined value.

3. The control apparatus for an internal combustion engine according to claim 1, wherein
    the limiting process includes a process that prohibits the dither control process.

4. The control apparatus for an internal combustion engine according to claim 1, wherein the limiting process includes a process that sets a difference between the air-fuel ratio of the lean combustion cylinder and the air-fuel ratio of the rich combustion cylinder to be smaller when the variation degree is greater than or equal to the predetermined value than when the variation degree is less than the predetermined value.

5. The control apparatus for an internal combustion engine according to claim 4, wherein
    the dither control process includes a variable setting process that variably sets a difference between the air-fuel ratio of the lean combustion cylinder and the air-fuel ratio of the rich combustion cylinder in accordance with an operating point of the internal combustion engine,
    the limiting process includes a guard process performed on the difference, which is set by the variable setting process, using an upper limit guard value, and
    when the variation degree is greater than or equal to the predetermined value, the upper limit guard value is smaller than when the variation degree is less than the predetermined value.

6. The control apparatus for an internal combustion engine according to claim 1, wherein
    the control apparatus is configured to execute the dither control process on a condition that a request for increasing a temperature of the catalyst is made due to at least a sulfur poisoning recovery request of the catalyst, and
    the control apparatus is configured so that the limiting process limits the dither control process that increases the temperature of the catalyst due to the sulfur poisoning recovery request.

7. The control apparatus for an internal combustion, engine according to claim 1, wherein the control apparatus is configured to execute the imbalance learning process on a condition that the dither control process is not executed.

\* \* \* \* \*